Patented Sept. 16, 1952

2,610,960

UNITED STATES PATENT OFFICE 2,610,960

THIXOTROPIC COMPOSITIONS

Birger W. Nordlander, Schenectady, N. Y., assignor to General Electric Company, a corporation of New York No Drawing. Application December 31, 1949, Serial No. 136,416

5 Claims. (Cl. 260—40)

1

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes have a disadvantage in that they draw away from corners and sharp edges, leaving these regions practically bare.

The net result of methods of coating and filling in such a manner is very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower overall heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper vacuum-pressure impregnating technique, not only to fill completely all the spaces in an open structure, such as a coil, but also to maintain this condition subsequently during the curing operation, provided that substantially no drainage of varnish occurs during the baking process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from object prior to and during curing.

Another object of this invention is to provide coating and filling compositions which may be applied and cured without loss of the composition.

A further object of the present invention is to provide coating and filling compositions which when applied to objects will remain in situ before and during curing even in corners and sharp edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperatures or at the elevated temperatures required for complete conversion of the composition to the infusible and insoluble state. The unusual combination of properties characterizing these compositions rests in the discovery that suitable quantities of certain specific fillers, in combination with solventless varnishes or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well-known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible sol-gel transformations, a fluid sol condition existing as long as the mixture is agitated, the sol reverting to a gel within a very short time after agitation has ceased. However, upon heating the gel it polymerizes into an infusible product which is no longer capable of reversion to the fluid sol state. The system may be simply expressed by the following relationship:

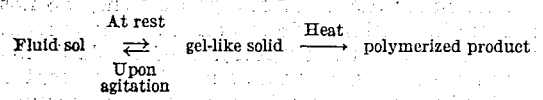

The term "thixotropy" is used herein to denote the property of a fluid filler-liquid composition to revert rapidly on standing into a gel-like mass having sufficient cohesive strength to withstand distortion by gravitational force when suspended freely as in an inverted receptacle or on a coated object. The gel is also of such a nature that it can be fluidified by the application of mechanical agitation as by shaking, stirring, vibrating, etc. The property of thixotropy as understood herein is thus characterized by a reversible isothermal sol⇌gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an alpha unsaturated alpha, beta polycarboxylic acid or a plurality of polycarboxylic acids, one of which, at least, is an alpha unsaturated alpha, beta polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethylene glycol, pentamethylene glycol, glycerine or pentaerythritol in combination with a monohydric alcohol etc. Examples of unsaturated polycarboxylic acids are maleic, fumaric, and itaconic acids. Anhydrides of polycarboxylic acids may also be employed. The term "polycorboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated aromatic polycarboxylic acids and polybasic inorganic acids. Examples of such substances are diallyl phthalate, diallyl succinate, diallyl maleate, diallyl fumarate, diallyl itaconate, diallyl chorophthalates, and triallyl phosphate. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

The thixotropic compositions of this invention may be converted into an infusible insoluble state by means of heat alone, for example, by curing parts coated or filled with these compositions at temperatures of from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, di-tertiary butyl diperphthalate, and tertiary butyl hydroperoxide. Any suitable amount of catalyst may be used, but in general the catalyst concentration will be within the range of from about 0.5 to about 2.0 percent by weight of the polymerizable liquid.

It has been found that only certain fillers in combination with the above polymerizable liquids will provide thixotropic properties in the compositions. Such fillers will hereafter be referred to as "effective" fillers.

In copending applications Serial Numbers 136,411, 136,412, 136,413, 136,415, 136,417, 136,418, filed concurrently herewith and assigned to the same assignee as the present application there are described certain solventless thixotropic varnish-filler compositions.

It has been found that powdered, expanded vermiculite mica provides an effective filler in producing thixotropic composition when added to the present solventless varnishes in proportions ranging from 20 to 30 per cent, by weight, based on the weight of the thixotropic composition. In preparing the vermiculite mica for use in the present connection, the micaceous material is heated to 1400° F. until it has expanded. The expanded product is then grounded to a powder and is ready for use.

*Example 1*

| | Parts |
|---|---|
| Diallyl phthalate | 39.5 |
| Diethylene glycol maleate | 39.5 |
| Tertiary butyl perbenzoate | 1.0 |
| Vermiculite (expanded and powdered) | 20.0 |

The above ingredients were thoroughly mixed, producing a smooth, homogeneous composition having pronounced thixotropic properties. To demonstrate the thixotropic properties of the composition a glass rod was dipped-coated in the material and allowed to hang free at room temperature. After sixteen hours there had been no drainage of the thixotropic material from the rod. The coated rod was next exposed to a temperature of 100° C. for sixteen hours during which time the coating was cured. Even after this treatment, there was no drainage of the thixotropic coating material from the rod. When the effective filler of vermiculite was excluded from the formulation, the major part of the coating drained from the rod after a very short time at room temperature. It will thus be seen that the present effective filler allows the efficient use of the present solventless varnishes for coating and filling purposes with no loss or drainage of material after coating and during curing.

*Example 2*

| | Parts |
|---|---|
| Diallyl phthalate | 34.5 |
| Diethylene glycol maleate | 34.5 |
| Tertiary butyl perbenzoate | 1.0 |
| Vermiculite (expanded and powdered) | 30.0 |

The above were mixed together and formed a smooth, homogeneous composition with pronounced thixotropic properties. A glass rod dip-coated in the composition exhibited no drainage after hanging for sixteen hours at room temperature. Neither had any of the coating drained off after a sixteen hour cure treatment at 100° C.

Other fillers in addition to the effective fillers described herein may be incorporated in the composition in small amounts up to the point where the thixotropic properties are not substantially reduced. Such ineffective fillers are not in themselves capable of affording thixotropic compositions when mixed with the present polymerizable liquids. Examples of such ineffective fillers are silex or sand, talc, Carborundum, Alundum, litharge, iron powder, zirconium oxide, calcium tungstate, tungsten oxide and nickel oxide. The use of the above ineffective fillers offers a convenient method of obtaining the thixotropic characteristics of the present compositions while retaining a high total filler content and utilizing to advantage whatever outstanding physical property (dielectric, moisture resistance, hardness, tensile strength, toughness, etc.) that the inert filler may contribute to the final heat-polymerized product.

What I claim as new and desire to secure by Letters Patent of the United States, is:

1. A thixotropic composition comprising a polymerizable fluid comprising a liquid unsaturated alkyd resin obtained by the esterification of a mixture of ingredients comprising a polyhydric alcohol and an alpha unsaturated alpha, beta polycarboxylic acid and a filler comprising expanded, powdered vermiculite, the latter material comprising from 20 to 30%, by weight, based on the weight of the thixotropic composition.

2. A thixotropic composition comprising a polymerizable fluid comprising a liquid unsaturated alkyd resin obtained by the esterification of a mixture of ingredients comprising a polyhydric alcohol and an alpha unsaturated alpha, beta polycarboxylic acid and a polymerizable ester of an unsaturated monohydric alcohol and a polycarboxylic acid, and a filler comprising expanded, powdered vermiculite, the latter material comprising from 20 to 30%, by weight, based on the weight of the thixotropic composition.

3. A thixotropic composition comprising a polymerizable fluid comprising a liquid unsaturated alkyd resin obtained by the esterification of a mixture of ingredients comprising a polyhydric alcohol and an alpha unsaturated alpha, beta polycarboxylic acid and an ester of a monohydric alcohol and an unsaturated polycarboxylic acid, capable of copolymerizing with unsaturated alkyd resins, and a filler comprising expanded, powdered vermiculite, the latter material comprising from 20 to 30%, by weight, based on the weight of the thixotropic composition.

4. A thixotropic composition comprising a polymerizable fluid comprising liquid diethylene glycol maleate obtained by the esterification of a mixture of ingredients comprising diethylene glycol and maleic anhydride and diallyl phthalate and a filler material comprising expanded, powdered vermiculite, the latter material comprising from 20 to 30%, by weight, based on the weight of the thixotropic composition.

5. A thixotropic composition comprising a polymerizable fluid comprising liquid diethylene glycol maleate obtained by the esterification of a mixture of ingredients comprising diethylene glycol and maleic anhydride and a polymerizable ester of an unsaturated monohydric alcohol and a polycarboxylic acid, and a filler comprising expanded, powdered vermiculite, the latter material comprising from 20 to 30%, by weight, based on the weight of the thixotropic composition.

BIRGER W. NORDLANDER.

REFERENCES CITED

The following references are of record in the file of this patent:

UNITED STATES PATENTS

| Number | Name | Date |
|---|---|---|
| 2,442,911 | Trent et al. | June 8, 1948 |
| 2,443,736 | Kropa | June 22, 1948 |
| 2,482,086 | Foster | Sept. 20, 1949 |

OTHER REFERENCES

"Industrial Chemistry of Colloidal and Amorphous Materials," by Lewis et al., published in 1943 by MacMillan Co., page 327.